Figure 6:
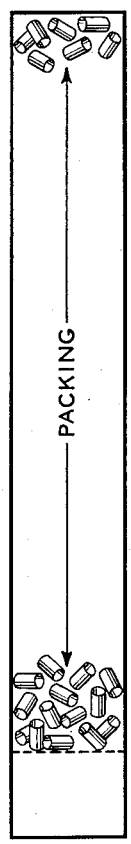

March 7, 1961   W. J. McCLEMENTS ET AL   2,974,150
ETHYLENE OXIDATION
Filed Feb. 20, 1959

PACKING IN
REACTOR TUBE

RING

LESSING RING

CURLICUE

TRIANGLE

HELICES

INVENTORS
WILLARD J. McCLEMENTS
RICHARD C. DATIN
BY
ATTORNEY

United States Patent Office 2,974,150
Patented Mar. 7, 1961

2,974,150

ETHYLENE OXIDATION

Willard J. McClements, Hopewell, and Richard C. Datin, Petersburg, Va., assignors to Allied Chemical Corporation, New York, N.Y., a corporation of New York Filed Feb. 20, 1959, Ser. No. 794,743

5 Claims. (Cl. 260—348.5)

This invention relates to the oxidation of ethylene oxide and more particularly refers to a new and improved method for the production of ethylene oxide by direct oxidation of ethylene with oxygen using a skeletal silver catalyst of high specific activity.

The conversion of ethylene with oxygen is conventionally carried out in a multitube reactor consisting of a plurality of parallel thin wall tubes about 10 to 25 feet long and about 1 to 2 inches in diameter, which tubes are filled with pellets of a supported silver catalyst through which the gaseous reactants, ethylene and oxygen with an inert gaseous medium, are passed, and which tubes are surrounded by a liquid bath for extracting the exothermic heat of reaction and regulating the temperature of the reaction.

Although the production of ethylene oxide by direct oxidation of ethylene is and has been commercially practiced, it nevertheless is subject to serious disadvantages. This may be briefly illustrated by a review of the cost of the principal reactants as compared with the cost of the final product—ethylene, the principal reactant costs about five cents a pound; air, the other reactant has comparatively negligible value; however the cost to produce the ethylene oxide product exceeds the cost of the reactants. The reasons for the high cost of producing ethylene oxide from such relatively simple inexpensive reactants as ethylene and air are several: the normal ethylene and oxygen content in the reaction gases passing through the catalyst bed are about 4.5% and 5.5%, respectively, with the balance an inert gaseous medium, generally nitrogen. The art has not as yet succeeded in appreciably increasing the concentrations of ethylene and oxygen in the reactant gases. The throughput expressed in terms of space velocity which defines in great measure the amount of productivity from a unit of given size representing capital investment and also operating charges is relatively low, below 10,000 hr.$^{-1}$, more generally between about 5–8,000 hr.$^{-1}$. Obviously, a material increase in space velocity represents a substantial saving in capital investment and operating expense. Further, there is the matter of activity and selectivity of the catalyst. A catalyst which is highly active and causes reaction of a substantial part of the ethylene and oxygen passing in contact with it is of course highly desirable. But this is not sufficient. The catalyst should be highly selective in that it must convert the ethylene to ethylene oxide with a minimum amount of carbon dioxide formation, which latter is a waste product resulting from the destruction of ethylene. The art has striven in the direction of improving the activity and selectivity of the catalyst and to some extent has achieved improvement in that direction. Unfortunately, the benefits of the more active catalysts could not be realized because of operational difficulties inherent in the process, particularly with respect to "hot spots," with "short life" of catalyst necessitating frequent shutdowns (non-productive periods), expensive catalyst replacement, and additional high labor costs.

An object of the present invention is to provide a method of conditioning and operating a highly active silver catalyst for the oxidation of ethylene to ethylene oxide with effective utilization of the highly active catalyst.

Another object of the present invention is to provide a method of converting ethylene to ethylene oxide by direct oxidation under conditions of high space velocities and high superatmospheric pressure to produce substantially increased quantities of ethylene oxide.

A further object of the present invention is to provide a method of commercially operating with the use of a highly active silver catalyst to produce increased quantities of ethylene oxide without material loss of activity and selectivity of the catalyst.

Other objects and advantages will be apparent from the following description.

It is known that an active silver catalyst for the oxidation of hydrocarbons, such as ethylene, can be prepared by chemically treating an alloy of silver and alkaline earth metal to remove most of the alkaline earth metal. Such a catalyst is known in the art as skeletal silver catalyst as described in U.S. Patents 2,562,857 and 2,562,858. This type of catalyst can be bonded to metal strips or other types of support as described in U.S. Patents 2,686,762 and 2,829,116.

While the silver-alkaline earth metal catalysts are reported as highly efficient, their use has been confined to small scale testing equipment and to operating conditions unrealistic to attain on a commercial scale. In commercial operation it would be extremely difficult to use these active compositions. The difficulty is one of heat transfer which becomes more of a problem in larger scale production. High reaction rate caused by the active catalyst results in local overheating of the catalyst with a greater production of carbon dioxide and an adverse effect on the activity of the catalyst. To better remove the heat of reaction and make the active catalyst more practical, the catalyst may be bonded on fins and on tube walls. However, special type reactors of more difficult design characteristics are very expensive and not well suited to commercial operations. The problem of loss of catalyst effectiveness is aggrevated when operating the process at high pressures, i.e. pressures above 100 p.s.i.g., more generally within the range of 150 to 300 p.s.i.g. as contrasted to the low pressure processes, i.e. ethylene oxidation at pressures below 100 p.s.i.g. The addition of an inhibitor, as for example ethylene dichloride or a chlorinated polyphenyl compound in small amount as is conventional, has a limited benefit but is inadequate to control hot spots and temperature variations in the catalyst bed.

Figure 1:
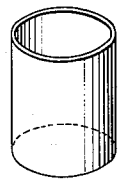
Figure 2:
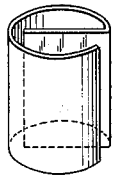
Figure 3:
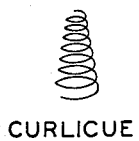
Figure 4:
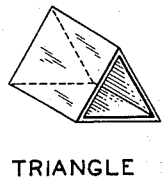
Figure 5:
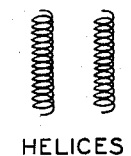

The highly active skeletal silver catalysts of the present invention are a silver-alkaline earth metal alloy bonded to a metal support and treated to remove a substantial portion of the alkaline earth metal. The catalyst may be prepared as described in U.S. Patent 2,686,762. The support is preferably in an irregular-shaped form offering low resistance to the flow of gases, as for example such support taking the form of rings, spirals, cork screws, triangles, curlicues, Lessing rings. In the preferred form the catalyst support is desirably a thin strip of silver or stainless steel metal having a thickness of 0.01 to 0.04 inch, preferably about 0.02 in, a width of ⅛ to ½ inch, preferably ¼ to ⅜ inch, and a length of ⅜ to 1¾ inches, preferably 1 to 1⅝ inches. These strips may be twisted in the form of a ring or a curlicue form similar to a shaving or in other suitable form which will offer a low impedance of the order of 2 to 60 pounds, preferably 2 to 50 pounds pressure drop, to the flow of gases per 19 feet of catalyst path. In the accompanying drawing are illustrated various forms of metal supported catalyst. Figure 1 shows the catalyst in the form of a ring; Figure 2 is a modified form of ring termed Lessing ring; Figure 3 illustrates a curlicue; Figure 4 shows a triangle form; Figure 5 shows the catalyst in the form of helices; Figure 6 illustrates a reactor tube packed with a metal supported catalyst. The active silver metal supported catalyst employed in the process of the application will hereinafter be designated as low flow resistance silver-alkaline earth metal alloy bonded to metal support catalyst. These catalysts are extremely active in the conversion of ethylene to ethylene oxide but their potentialities were never realized in commercial operation because under the conditions of high productivity of ethylene oxide the catalyst rapidly depreciated, resulting in loss of selectivity and activity and consequent inefficient operation.

In accordance with the present invention high productivity of ethylene oxide without loss of high catalyst activity is obtained by passing a gas mixture comprising 0.25–3%, preferably 1.0–1.5% $C_2H_4$; 1.0–4.5%, preferably 1.0–3.0% $O_2$; with the remainder inert gas, principally nitrogen, and a minor amount of carbon dioxide gas, through a small diameter elongated tube about 15–25 feet long with a diameter of about 1–2 inches, packed with low flow resistance silver-alkaline earth metal alloy catalyst at a space velocity of 14,000–25,000 hr.$^{-1}$ under high superatmospheric pressure above 100 p.s.i.g., preferably within the range of 100–300 p.s.i.g., and a temperature within the range of 175–230° C., preferably within the range of 210–220° C. and maintaining said conditions of space velocity, temperature, pressure and concentrations of $C_2H_4$ and $O_2$ for a period of about 15–30 hours to effect conditioning of the catalyst, thereafter increasing the concentration of ethylene and oxygen during the next 40–60 hours to about 3.5–5.5%, preferably 4.0–5.0%, and 4.5–8.0%, preferably 5.0–6.0%, respectively, then increasing the temperature to 230–300° C., preferably about 250–260° C. and maintaining the operation under conditions of higher temperature and higher concentrations of reactants for production of maximum yield of ethylene oxide. If desired, a small amount of chlorine inhibitor of the order of a few parts per million may be added to the gas mixture flowing through the catalyst. It is important that high space velocity of 14,000–25,000 hr.$^{-1}$ be maintained throughout the operation of the process.

The preferred catalyst is a ring type catalyst prepared as follows: A cleaned silver sheet 0.020 inch thick is cut in sheets about 1⅝ inch by 7 inches. These sheets are submerged in a bath of calcium-magnesium-silver alloy containing about 35% silver and a ratio of calcium to magnesium of about 4:1. The dipping is done in air and the thickness adjusted by chipping off the excess alloy. The sheets are annealed for 0.5 hour at 585° C. under argon, then cooled and cut into strips ¼ inch wide. The strips are formed into rings and activated. The activation consists in autoclaving in water at 200–250° C. for two hours and leaching with 20% acetic acid. The rings are washed, then dried at about 110°–120° C. The preferred catalyst may also be prepared by coating a stainless steel support.

The rings are charged to a tubular reactor, jacketed for cooling. The system is brought up to pressure with an inert gas such as nitrogen circulating through the reactor at a space velocity of about 14,000–25,000 hr.$^{-1}$. The bath is then brought up to about 215°–220° C. and air and ethylene fed to the system to maintain concentrations of 1.0–1.5% $C_2H_4$ and 1.0–3.0% oxygen. These conditions are held for about 24 hours after which the ethylene and oxygen concentrations are slowly increased during the next 48 hours to 4.0–5.0% and 5.0–6.0%, respectively, temperature being held constant at about 217–225° C. or sufficiently high to give about 0.3% oxide in the exit gases. Temperatures may then be increased slowly to given maximum yield.

The following examples contrast operation in which the catalyst is not conditioned as taught herein (Example 1) with operation in accordance with the present invention (Example 2).

EXAMPLE 1

A single tube reactor, Type 430 stainless steel, having a length of 23 feet 7 inches and an O.D. of 1⅛ inches, 14 B.W.G., was charged to a depth of 18 feet 7 inches with 2400 cc. (3797 grams) of a catalyst prepared as described above. The tube was jacketed with a 4-inch pipe 22 feet along to contain a tetralin bath and a 12 kw. emersion type heater was used to heat the tetralin to boiling. The temperature of the boiling tetralin was controlled by regulating pressure over the bath. The reactor was brought up to a pressure of 210 p.s.i.g. at 217° C. bath temperature using a typical recycle gas containing 4.5% ethylene, 5.5% oxygen, 7.5% carbon dioxide, 82.5% nitrogen and 1.4 p.p.m. chlorine. A gas flow of 20 c.f.m. (STP) was passed through the reactor. The catalyst hot-spotted immediately. At the top of the catalyst bed such intense heat was created that the catalyst fused and caused a partial block. Operation of the catalyst under these conditions was impossible.

EXAMPLE 2

A portion of the same catalyst used in Example 1 was brought into operation under the following controlled conditions. The system was brought to 210 p.s.i.g. with nitrogen and the bath raised to 214° C. Gas containing 0.95% carbon dioxide, 0.25% ethylene, 1.2% oxygen, and 97.6% nitrogen was passed through the tube at 20 c.f.m. (STP). During the first 24 hours the temperature of the bath was held at 214°–217° C. and the composition of the inlet gas was held at 1.0–1.5% ethylene, 1.0–3.0% oxygen, and 1.0–4.0% carbon dioxide. Flows were maintained at 20 c.f.m. During the next 48 hours the ethylene and oxygen concentrations were gradually increased to 4.5% and 5.5% respectively, while holding the bath at about 220° C. Temperatures were gradually increased to give maximum yields. Typical results taken during the above program are tabulated in Table 1. Of particular importance it should be noted that the space-time yield (productivity) obtained under the conditions of operation was about 15.5 pounds of ethylene oxide/hr./cu. ft. of catalyst.

Table 1
ETHYLENE OXIDATION

| Hours | Bath Temp., °C. | Flow, c.f.m. (STP) | Pressure, p.s.i.g. In | Pressure, p.s.i.g. Exit | Percent Inlet $C_2H_4$ | Percent Inlet $O_2$ | Δ Percent Oxide | Percent Yield | Percent Efficiency | Percent Attack | Space-time Yield |
|---|---|---|---|---|---|---|---|---|---|---|---|
| *NO INHIBITOR* | | | | | | | | | | | |
| 1 | 214 | 20 | 210 | 166 | 0.3 | 1.2 | 0.08 | 2.4 | 43.8 | 54.1 | 1.4 |
| 2 | 217 | 20 | 210 | 166 | 1.5 | 0.9 | 0.12 | 8.9 | 43.8 | 20.8 | 2.1 |
| 16 | 217 | 20 | 198 | 152 | 1.4 | 2.8 | 0.19 | 13.1 | 59.4 | 22.1 | 3.3 |
| 24 | 217 | 20 | 198 | 152 | 1.2 | 2.9 | 0.15 | 12.0 | 62.5 | 19.2 | 2.6 |
| 38 | 217 | 20 | 198 | 152 | 1.7 | 3.6 | 0.25 | 13.5 | 68.5 | 19.1 | 4.3 |
| 47 | 217 | 20 | 198 | 152 | 3.0 | 4.6 | 0.32 | 10.4 | 68.6 | 15.1 | 5.6 |
| 64 | 222 | 21 | 198 | 151 | 3.0 | 4.4 | 0.38 | 12.7 | 76.1 | 16.7 | 6.9 |
| 75 | 222 | 21 | 198 | 152 | 4.4 | 5.3 | 0.38 | 8.5 | 71.5 | 11.9 | 6.9 |
| 94 | 225 | 21 | 198 | 152 | 4.2 | 5.5 | 0.41 | 9.5 | 67.6 | 14.1 | 7.5 |
| *1.2 P.P.M. $Cl_2$ INHIBITOR* | | | | | | | | | | | |
| 100 | 233 | 21 | 242 | 205 | 4.6 | 5.7 | 0.39 | 8.3 | 68.8 | 12.1 | 7.1 |
| 117 | 239 | 21 | 242 | 205 | 4.5 | 5.5 | 0.40 | 9.0 | 71.4 | 12.6 | 7.3 |
| 129 | 243 | 21 | 242 | 205 | 4.6 | 5.7 | 0.54 | 11.8 | 69.2 | 17.1 | 9.8 |
| 150 | 256 | 21 | 241 | 204 | 4.4 | 5.3 | 0.75 | 16.5 | 69.5 | 23.7 | 13.7 |
| 152 | 259 | 21 | 241 | 204 | 4.4 | 5.6 | 0.85 | 18.5 | 63.2 | 30.6 | 15.5 |

Percent yield = mols $C_2H_4O$ per 100 mols inlet $C_2H_4$.
Percent efficiency = mols $C_2H_4O$ per 100 mols $C_2H_4$ attacked.
Percent attack = mols $C_2H_4$ attacked per 100 mols inlet $C_2H_4$.
Space-time yield = lbs. $C_2H_4O$ per hr. per cu. ft. catalyst.

Although certain preferred embodiments of the invention have been disclosed for purpose of illustration, it will be evident that various changes and modifications may be made therein without departing from the scope and spirit of the invention.

We claim:

1. A process for production of ethylene oxide which comprises passing a gas mixture containing 0.25–3% $C_2H_4$, 1.0–4.5% $O_2$ with the remainder inert gas, through an elongated tube of small diameter of about 1–2 inches packed with low flow resistance silver-alkaline earth metal alloy catalyst at a space velocity of 14,000–25,000 hr.$^{-1}$ under high superatmospheric pressure above 100 to 300 p.s.i.g. and a temperature within the range of 175–230° C. and maintaining said conditions of space velocity, temperature, pressure and concentration of $C_2H_4$ and $O_2$ for a period of about 15–30 hours to effect conditioning of the catalyst, thereafter increasing the concentration of ethylene and oxygen during the next 40–60 hours to about 3.5–5.5% and 4.5–8.0%, respectively, then increasing the temperature to above 230° C. to about 300° C., and maintaining the operation under said conditions of higher temperature within the range of 230–300° C. and higher concentration of reactants within the range of 3.5–5.5% ethylene and 4.5–8.0% oxygen.

2. A process for production of ethylene oxide which comprises passing a gas mixture containing 1.0–1.0% $C_2H_4$, 1.0–3.0% $O_2$ with the remainder inert gas, through an elongated tubular reaction zone about 15–25 feet long with a diameter of about 1–2 inches packed with low flow resistance silver-alkaline earth metal alloy catalyst at a space velocity of 14,000–25,000 hr.$^{-1}$ under high superatmospheric pressure within the range of 100–300 p.s.i.g. and a temperature within the range of 210–220° C. and maintaining said conditions of space velocity, temperature, pressure and concentration of $C_2H_4$ and $O_2$ for a period of about 15–30 hours to effect conditioning of the catalyst, thereafter increasing the concentration of ethylene and oxygen during the next 40–60 hours to about 4.0–5.0% and 5.0–6.0%, respectively, then increasing the temperature to about 250–260° C., and maintaining the operation under said conditions of higher temperature of about 250–260° C. and higher concentration of reactants within the range of 4.0–5.0% ethylene and 5.0–6.0% oxygen.

3. A process as claimed in claim 2 wherein the catalyst support is stainless steel.

4. A process as claimed in claim 2 wherein the alloy of the catalyst is calcium-magnesium-silver alloy and wherein the catalyst support is a silver sheet.

5. A process as claimed in claim 2 wherein a small amount of chlorine inhibitor is added to the gas mixture passing through the catalyst tube.

References Cited in the file of this patent
UNITED STATES PATENTS

| | | |
|---|---|---|
| 2,125,333 | Carter | Aug. 2, 1938 |
| 2,241,019 | Mentzger | May 6, 1941 |
| 2,367,169 | Gardner | Jan. 9, 1945 |
| 2,562,857 | Cambron et al. | July 31, 1951 |
| 2,562,858 | Cambron et al. | July 31, 1951 |
| 2,686,762 | Tollefson | Aug. 17, 1954 |
| 2,777,862 | Egbert | Jan. 15, 1957 |
| 2,831,870 | McClements et al. | Apr. 22, 1958 |

FOREIGN PATENTS

| | | |
|---|---|---|
| 748,957 | Great Britain | May 16, 1956 |

OTHER REFERENCES

Li: Chemical Eng., vol. 65, No. 7, pp. 151–156 (1958).